US008913851B1

(12) United States Patent
Marwood et al.

(10) Patent No.: US 8,913,851 B1
(45) Date of Patent: Dec. 16, 2014

(54) FINGERPRINTING IMAGE USING POINTS OF INTEREST FOR ROBUST IMAGE IDENTIFICATION

(75) Inventors: David Marwood, San Francisco, CA (US); Richard Tucker, New York, NY (US)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 13/097,855

(22) Filed: Apr. 29, 2011

(51) Int. Cl.
*G06K 9/32* (2006.01)
*G06K 9/66* (2006.01)

(52) U.S. Cl.
USPC .......................................... 382/294; 382/190

(58) Field of Classification Search
None
See application file for complete search history.

(56) References Cited

U.S. PATENT DOCUMENTS

| | | | |
|---|---|---|---|
| 3,069,654 A | 12/1962 | Hough | |
| 6,205,452 B1* | 3/2001 | Warmus et al. | 715/246 |
| 6,285,774 B1 | 9/2001 | Schumann et al. | |
| 6,711,293 B1 | 3/2004 | Lowe | |
| 7,095,853 B2 | 8/2006 | Morishita | |
| 7,532,804 B2 | 5/2009 | Kim | |
| 2004/0128511 A1* | 7/2004 | Sun et al. | 713/176 |
| 2004/0258397 A1 | 12/2004 | Kim | |
| 2008/0008348 A1* | 1/2008 | Metois et al. | 382/100 |
| 2009/0276468 A1 | 11/2009 | Menon et al. | |
| 2010/0211794 A1* | 8/2010 | Bilobrov | 713/176 |
| 2010/0303366 A1* | 12/2010 | Zhang | 382/218 |

OTHER PUBLICATIONS

Tuytelaars, Tinne et al., "Local Invariant Feature Detectors: A Survey," Jan. 3, 2008, Foundations and Trends in Computer Graphics and Vision Journal, vol. 3, 105 pages.*

Abstract, "A robust image fingerprinting system using the Radon transform" by Seo, et al., Jan. 11, 2004, 2 pgs.
Abstract, "Media Forensics and Security" by Delp III, et al. Feb. 4, 2009, 1 pg.
Chao, Wei-Lun, "Introduction to Video Fingerprinting", Graduate Institute of Communication Engineering, NTU, 26 pgs.
Chao, Wei-Lun, "The Core of Video Fingerprinting: Examples of Feature Extraction", Graduate Institute of Communication Engineering, NTU, 35 pgs.
Joly, et al. "Robust Content-Based Video Copy Identification in a Large Reference Database", Departmenté Recherche et Études, Institut National de l'Audiovisuel, 10 pgs.
Law-to, et al., "Video Copy Detection: a Comparative Study", Amsterdam, The Netherlands, Jul. 9-11, 2007, 8 pgs.

(Continued)

*Primary Examiner* — Jason M Repko
*Assistant Examiner* — Ryan P Potts
(74) *Attorney, Agent, or Firm* — Fish & Richardson P.C.

(57) ABSTRACT

A system and method of use are provided for generating video fingerprints that are robust to rotation, stretching, scaling, flipping and other affine transformations. The system and method are based on determining points of interest for a target video image and a collection of images stored in a database. A method of identifying a copied video image is also provided through comparison of the fingerprint of the target video image with fingerprints of images in a database. The method of video fingerprinting involves: defining points of interest from a video image, determining an oriented bounding area encompassing said points of interest that have been transformed by the same transformations used to produce the oriented bounding area and creating a fingerprint by encoding the points of interest as Gray Code such that similar images have a small Hamming distance and dissimilar images have a large Hamming distance. The identification of points of interest are provided by a number of techniques including segmentation, identification of affine covariant regions and scale invariant features.

26 Claims, 5 Drawing Sheets

(56) References Cited

OTHER PUBLICATIONS

Lee, Sunil and Chang D. Yoo, "Robust Video Fingerprinting Based on 2D-OPCA of Affine Covariant Regions," Div. of EE, School of EECS, KAIST, 4 pgs.

Malik, Om, "Video Fingerprinting Bull Market", Mar. 14, 2007, 1 pg.
Radhakrishnan, et al.," Video Fingerprinting Based on Moment Invariants Capturing Appearance and Motion," Dolby Laboratories Inc, IEEE, 2009, 1532-1535.
Su, Xing, et al., "Robust Video Fingerprinting Based on Visual Attention Regions," IEEE, 2009, 4 pgs.

* cited by examiner

FINGERPRINTING IMAGE USING POINTS OF INTEREST FOR ROBUST IMAGE IDENTIFICATION

BACKGROUND

1. Field

The field relates to image identification.

2. Background Art

Video content is increasingly popular and easy to publish and distribute to users. Video content can now be viewed on a variety of different devices using a variety of different video players. Video content can be provided on tape, memory, storage disks (e.g., DVDs), or other storage media. Video content is often streamed or downloaded over computer networks, such as, the Internet or other networks. The World Wide Web further supports the publication and distribution of video content. A number of different publishers increasingly serve or publish video content online to remote users. Online sites, such as Hulu.com and youtube.com, that allow users to view video legally are some of the most popular on the Web.

With this increase in the volume and popularity of video it is even more desirable to identify and prevent illegal copying and distribution of video content (also called videos). Current techniques to identify illegal video copies are limited. For example, with existing techniques, an attacker can prevent a probe video from matching the reference videos by modifying the probe video. For instance, current existing techniques are not robust to transformations involving recompression, rotation, stretching, scaling or flipping.

An example of an existing technique is YouTube's ContentID system that attempts to match videos that are visually similar. At its core, it compares probe video frames against a collection of reference video frames. The comparison is done by comparing the Hamming distance between fingerprints of the video frames.

However, techniques are still needed that are robust against transformation involving recompression, rotation, stretching, scaling or flipping.

BRIEF SUMMARY

A computer based method of image fingerprinting is provided comprising defining points of interest of an image, wherein each point of interest corresponds to a feature of the image, determining a bounding area based on said points of interest, determining a transformation to transform the bounding area to a predetermined size, shape, and orientation, applying the transformation to the points of interest, and encoding the transformed points of interest to create a fingerprint, wherein the fingerprint can be used to identify the image independently of a size, shape, and orientation of the image.

Also provided is a method of detecting a copy of a video image comprising: comparing the fingerprint of a target video image with those of images in a database to determine a match between the target fingerprint and a fingerprint in the database. Likewise a method of detecting a copy of a video image that has been flipped is provided, comprising: comparing the fingerprint of the target video image with fingerprints in a database generated from flipped images to determine a match between the target fingerprint and a fingerprint in the database. A method of detecting a sequence of video images from a video program is also provided, comprising: selecting a sequence of video images; generating a fingerprint for each of the images; and comparing the resulting sequence of fingerprints with fingerprint sequences in a database to determine a match between the target video program and a program in the database.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Embodiments of the present invention are directed to a system and method for detection of images and video frames based on a method of finger printing using points of interest. It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments described here include systems and methods for generating video fingerprints that are robust to rotation, stretching, scaling, flipping and other affine transformations. Also, provided is a method of video copy detection. The disclosed embodiments borrow techniques from computer graphics and computer vision, for example, image segmentation in which an image is divided into semantically meaningful regions. Video fingerprints are constructed based on so-called "points of interest." In the situation in which an image is segmented, interest points are defined as points at which three or more regions intersect. There are other ways of defining interest points that are provided by embodiments of the disclosed invention including techniques based on the notion of Maximally Stable Extremal Regions (MSER), Scale Invariant Feature Transform (SIFT) and the like.

Interest points correspond to features in an image (i.e., "image features") that are preserved under various transformations (e.g., scaling, stretching, rotation, flipping) that can be applied to an image. For example, a corner of a window is recognizable after various transformations have been applied to an image containing the corner. As such, a point in the image corresponding to a window corner may be identified as a "point of interest." In an example, an image may have over a hundred points of interest.

Video fingerprints are generated that are robust against recompression, rotation, stretching, scaling and flipping by surrounding the interest points with an oriented bounding box. In constructing the oriented bounding box, the interest points in the bounding box are rotated, scaled and stretched according to the transformation required to generate the oriented bounding box so that they can continue to be contained within the modified bounding box. Because they are transformed in various ways to produce the oriented bounding box, they are rendered invariant to such transformations. As such, it is possible to identify the image independently of a size, shape, and orientation of the image resulting from transforming the image. In this application, the words "bounding box" should also be interpreted to mean "bounding area," that is, an arbitrary area encompassing points of interest. Thus the words "bounding box" are used for convenience of description and are not intended to be limiting. Thus a bounding box or bounding area may be more general than a square, rectangle or polygon.

For two similar images, the resulting points of interest will be similar. Dissimilar images will have different points of interest. To facilitate fast comparisons between the fingerprint of a target image and those in a database, the fingerprints are stored as Gray Code such that two similar images have a small Hamming distance and dissimilar images have a large Hamming distance.

In order to judge if a target image matches an image in a database, it is convenient to define a "similarity value." For example, a similarity value might be defined as the percentage of interest points in a target image that match corresponding interest points in a reference image in a database. In another example, an interest point can be judged to match a corresponding interest point in a reference image if the Hamming distance between the two points is smaller than some predetermined value. If the similarity value between a target image and a reference image in a data base is greater than a predetermined value, the image is said to match an existing image in the database.

In order to facilitate video copy detection of an image that has been flipped, in addition to storing a database of video fingerprints, fingerprints are also stored for images that have been flipped.

Figure 1:
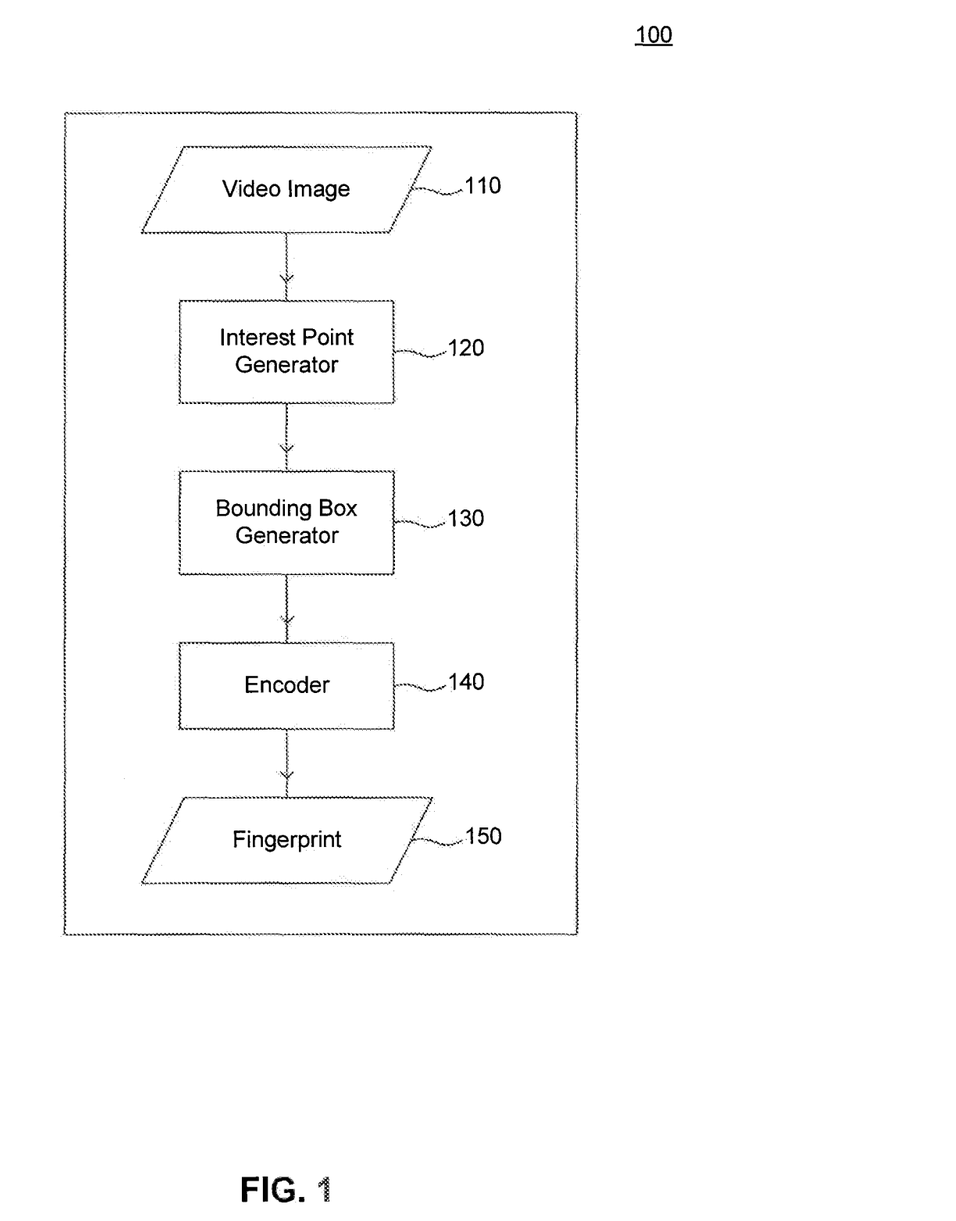
FIG. 1 is a schematic illustration of an embodiment of the disclosed invention comprising an interest point generator, a bounding box generator and an encoder.

FIG. 1 schematically illustrates an embodiment in the form of a computer based system 100 for generating a finger print for a video frame or image. The system takes a video image 110 as input. The input image is then fed to an interest point generator 120. The output of the interest point generator 120 is a collection of interest points expressed as a pair of numbers giving the X-Y coordinates of each interest point. The interest points are then fed as input to the bounding box generator 130 which generates an oriented bounding box as will be described below. In constructing the oriented bounding box, various transformations are carried out on the interest points to yield a set of point that are invariant to such transformations. The resulting points are then fed as input to the encoder 140 which stores the points as Gray Code. The resulting collection of transformed interest points is called the fingerprint 150.

Computer-based system 100 including interest point generator 120, bounding box generator 130, and encoder 140 can be implemented on one or more computing devices on the same or different machines. Interest point generator 120, bounding box generator 130, and encoder 140 can be implemented in software, firmware, hardware or a combination thereof. Examples of computing devices include, but are not limited to, a computer, workstation, distributed computing system, computer cluster, embedded system, stand-alone electronic device, networked device, mobile device (e.g. mobile phone or mobile computing device such as a tablet or laptop computer), rack server, set-top box, or other type of computer system having at least one processor and memory. Such a computing device may include software, firmware, hardware, or a combination thereof. Software may include one or more applications and an operating system. Hardware can include, but is not limited to, a processor, memory and graphical user interface display.

Figure 2:
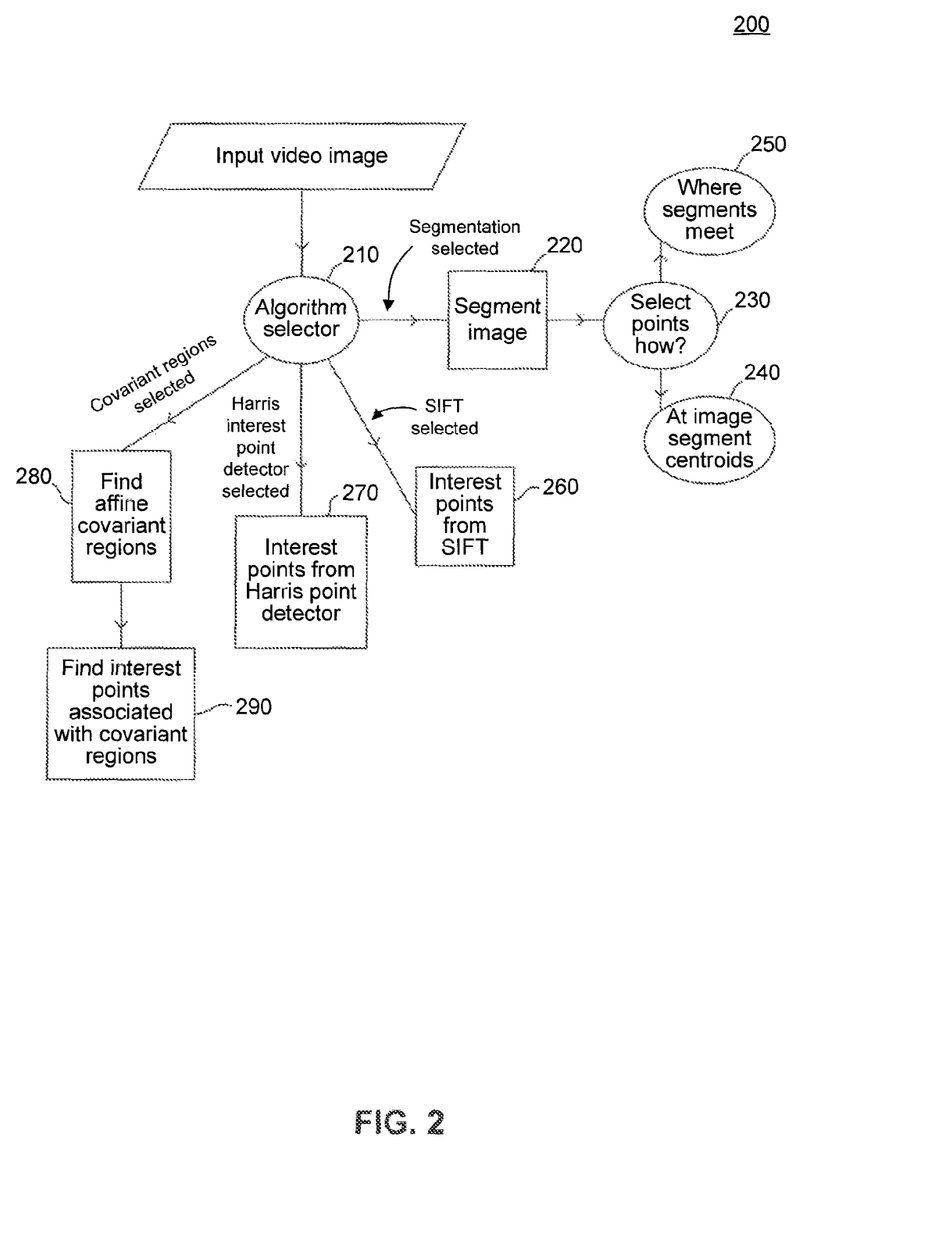
FIG. 2 is a schematic illustration of the operation of the interest point generator.
Figure 3:
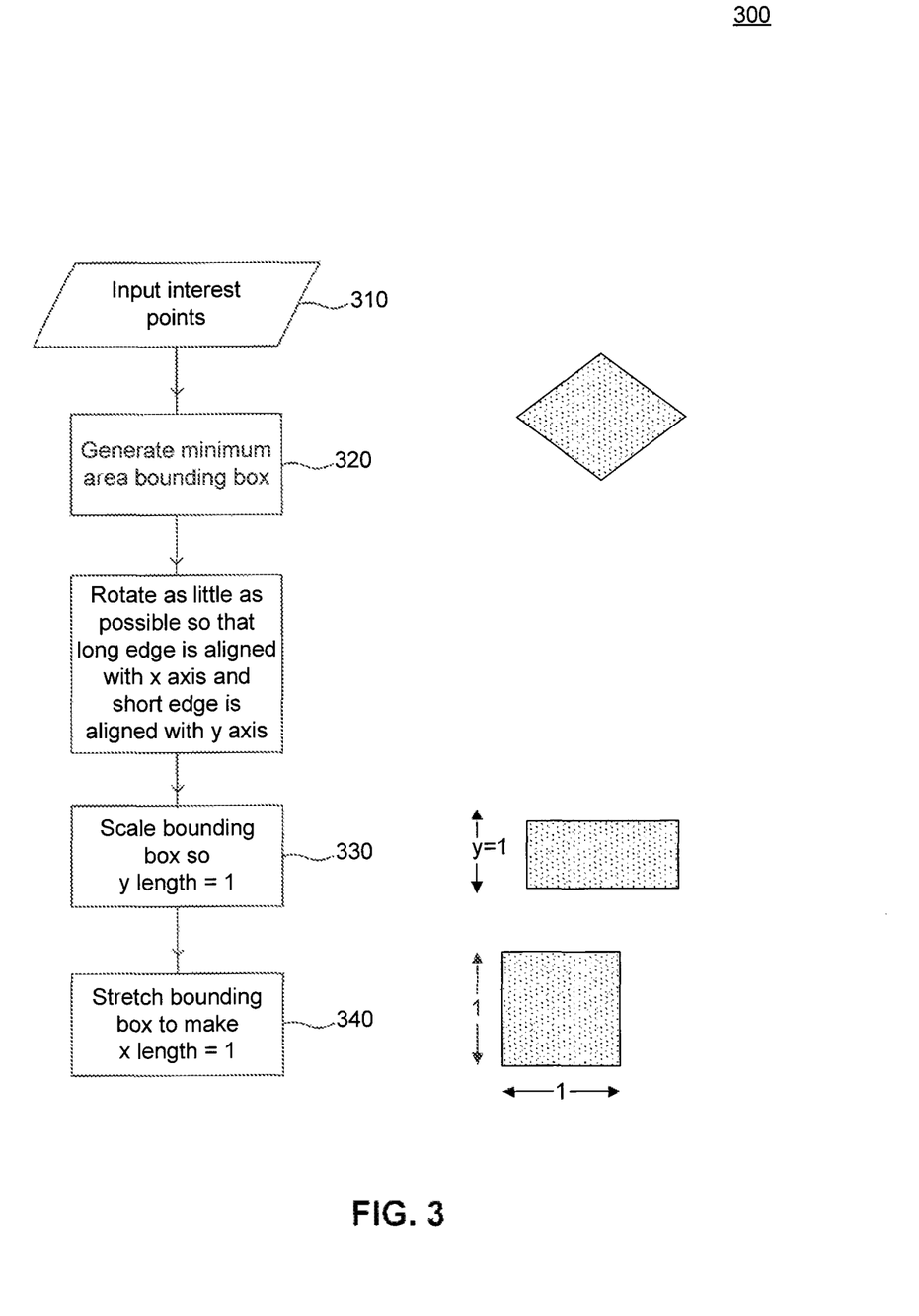
FIG. 3 is a schematic illustration of the operation of the bounding box generator.
Figure 4:
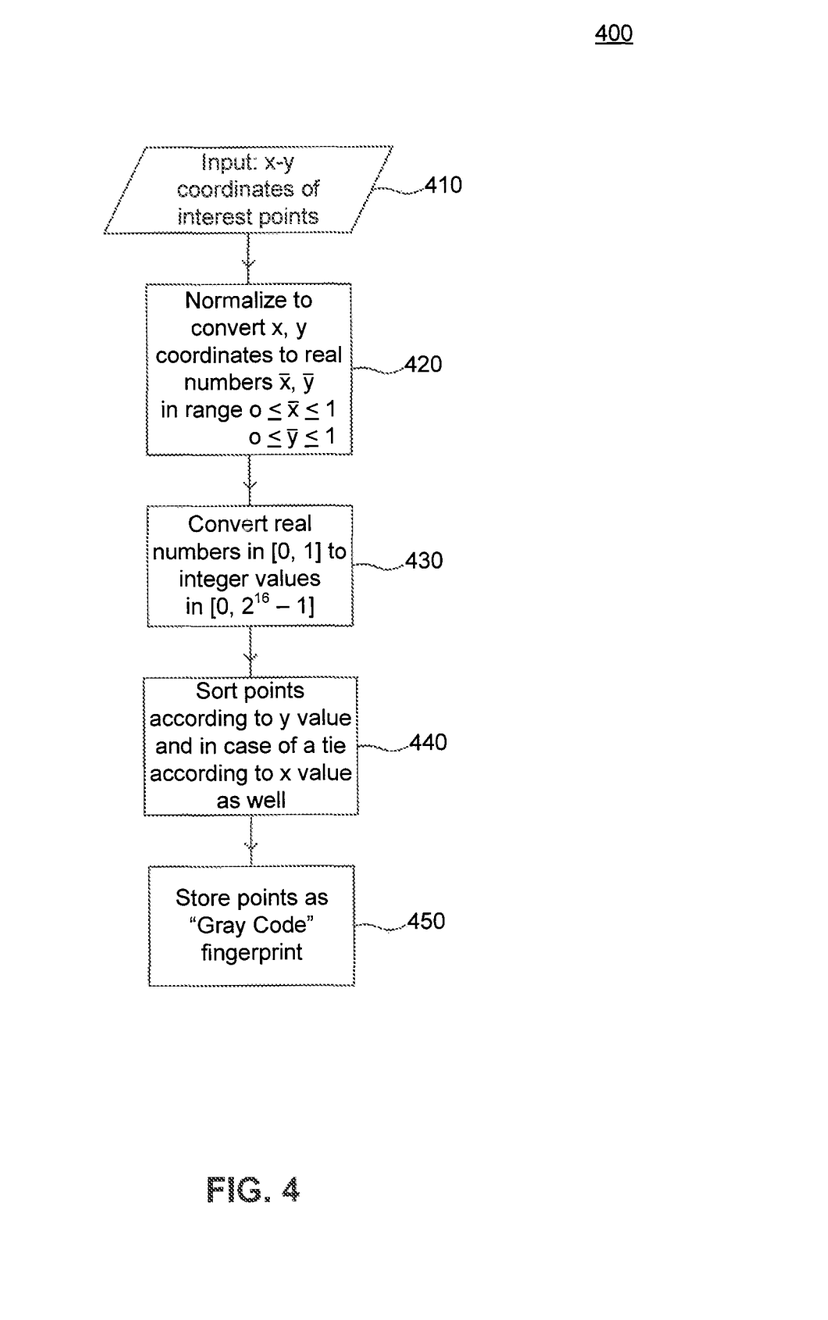
FIG. 4 is a schematic illustration of the operation of the encoder.

FIGS. 2-4 illustrate in more detail various embodiments of the invention schematically illustrated in FIG. 1.

FIG. 2 represents schematically the operation of the interest point generator 120. The various algorithms discussed with respect to FIG. 2 are fairly common in the field of computer vision and graphics and will not be discussed in detail. There are a number of algorithms that can be selected for generating interest points. The algorithm selector 210 takes input from the user to choose a particular algorithm required for generating interest points. In one embodiment, interest points are generated based on a procedure that starts by segmenting the image. If algorithm 220 is selected, the image will be segmented. Once the image is segmented there are two ways of choosing interest points 230. One way 250 is to associate an interest point with each point where three or more segments meet. Interest points can also be chosen to coincide with segment centroids 240.

In another embodiment, the Scale Invariant Feature Transform (SIFT) algorithm is chosen to define interest points 260. In another embodiment, interest points are defined 270 using the Harris Interest Point Detector. In yet another embodiment, interest points are based on determining covariant regions 280 and associating interest points 290 with such covariant regions.

FIG. 3 illustrates the operation of the bounding box generator. Interest points, determined by the interest point generator 120 are input to the bounding box generator 130. In the next step 320 a minimum area bounding box, in the form of a rectangle is first drawn. Next, a transformation is determined to transform the bounding box to a predetermined size, shape and orientation. In general such a minimum area bounding box will be rotated with respect to the X-Y axes. The next step is to take the rotated bounding box 320, rotate it as little as possible so that the long edge is aligned with the X axis and the short edge is aligned with the Y axis, and to scale the bounding box (preserving its aspect ratio) 330 such that the Y length=1. In the last step 340 the bounding box is stretched so as to make the box X length=1. All of the various transformations (rotation, stretching, scaling etc.) that are applied to the minimum area bounding box 320 to produce the oriented bounding box 340 are also applied to the collection of interest points that were given as input to the bounding box generator 130. As such, the resulting collection of interest points fits inside the oriented bounding box 340 which has unit area and has its edges aligned with the X and Y axes. By generating all fingerprints in this way, all finger prints can be compared on an equal footing and are thus invariant to the various transformations carried out to construct the oriented bounding box.

FIG. 4 schematically illustrates the operation of the encoder 140 first mentioned in FIG. 1. The transformed interest points that are output from the bounding box generator 130 are input to the encoder 140 in the form of XY coordinates 410 in FIG. 4. The next step is to normalize the XY coordinates of the interest points to yield real numbers 420 in the range [0,1]. The next step is to convert the real numbers in the range [0,1] to integer values 430 in the range $[0, 2^{16}-1]$. The next step is to sort the interest points 440 according to the Y value and in case of a tie, also according to the X value. The last step is to store the points as Gray Code 450 resulting in the fingerprint.

Figure 5:
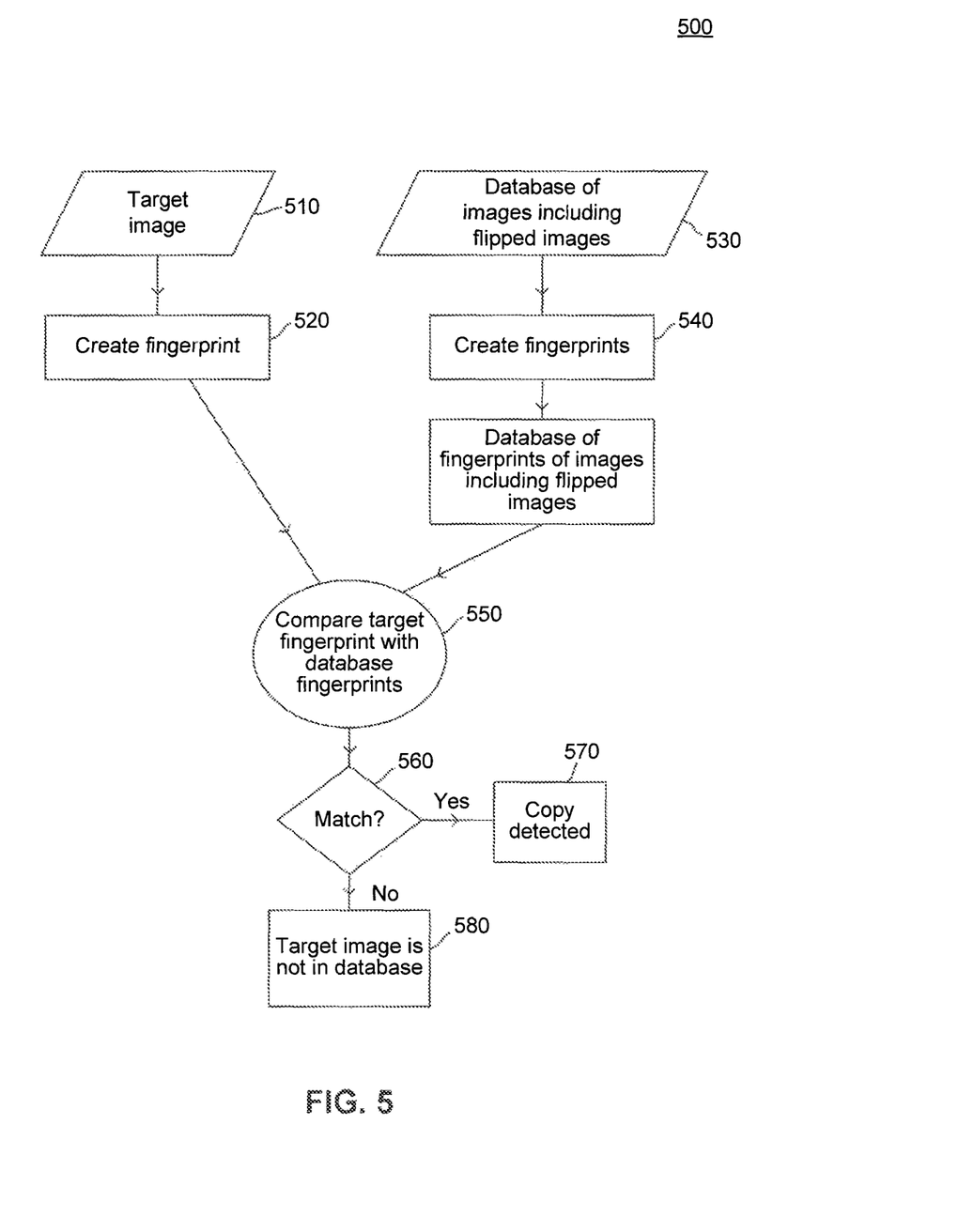
FIG. 5 is a schematic illustration of the operation of the method by which a copied video is detected.

As a further embodiment, a method of video copy detection that is in variant against recompression, rotation, stretching, scaling or flipping is provided as illustrated in FIG. 5. The input 510 to the method is a target image. From the input image 510, a fingerprint 520 is created according to an embodiment of the invention as described with reference to FIGS. 1-4 and the preceding discussion. This target fingerprint is then compared 550 to similarly created fingerprints in a database 540. The fingerprints in the database 540 are created from a database of images 530 that includes original as well as flipped images. The fingerprint for the target image is then compared 550 with the finger prints for images in the data base 540 to determine whether or not 560 there is a match. Finding a match 570 implies that a copy of the target image has been detected. If there is no match 580 then the target image is not in the database.

Lastly a method of detecting a copy of a video program is provided. In general, a video program is a sequence of images, that is, a set of images that are rendered in succession over a time interval. A corresponding sequence of finger prints is generated from the sequence of images.

In this method, a sequence of fingerprints corresponding to a sequence of images from video program is compared with predetermined sequences of fingerprints in a data base of finger print sequences to determine a similarity value. A similarity value, for example, can be the number of images in a given sequence that are matched by corresponding images in one or more sequences in a database of fingerprint sequences.

In another embodiment, a histogram of interest points appearing in multiple images, over a time interval can be constructed. The comparison to generate the similarity value can be based on considering only the top "k" interest points by frequency, where "k" is an integer representing a subset of interest points that appear in multiple images in a sequence.

By using this method, it is possible to determine if a particular video program is an unauthorized copy when the sequence of fingerprints for the video program matches a predetermined fingerprint sequence in the fingerprint database. As discussed above, a match is determined if the similarity value is above a certain threshold.

CONCLUSION

The summary and abstract sections may set forth one or more but not all exemplary embodiments of the present invention as contemplated by the inventor(s), and thus, are not intended to limit the present invention and the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer based method of image fingerprinting, comprising:
   (a) determining points of interest of an image, each point of interest corresponding to a feature of the image;
   (b) determining a bounding area that encompasses said points of interest;
   (c) determining a transformation that transforms the bounding area to an oriented bounding area, wherein the oriented bounding area has a predetermined size, shape, and orientation, the determining (c) further comprising:
      (i) rotating as necessary to align the edges of the bounding area with predetermined first and second perpendicular axes,
      (ii) scaling along the first axis as necessary for a first edge of the bounding area to have a length equal to a predefined length L, and
      (iii) stretching along the second axis as necessary for a second edge of the bounding area to have a length equal to the first edge of the bounding area;
   (d) transforming the points of interest in accordance with the determined transformation such that the transformed points of interest are encompassed by the oriented bounding area;
   (e) encoding the transformed points of interest transformed in step (d) to create a fingerprint, wherein the fingerprint can be used to identify at least a portion of the image independently of a size, shape, and orientation of the image; and
   (f) selecting the image to be a frame of a video, wherein the fingerprint can be used to identify the frame of the video.

2. The method of claim 1, further comprising:
   (f) determining whether the fingerprint matches at least one fingerprint in a database of fingerprints; and
   (g) determining the image to be an unauthorized copy when the fingerprint matches at least one fingerprint in the database of fingerprints as determined in step (f).

3. The method of claim 1, wherein determining (c) comprises determining the transformation to include flipping.

4. The method of claim 1, wherein the determining (b) comprises determining the bounding area to be a minimal area rectangle encompassing the points of interest.

5. The method of claim 4, wherein the determining (c) further comprises: determining the transformation to include (i) rotating as necessary to align the edges of the minimal area rectangle with predetermined first and second axes, (ii) scaling along the first axis as necessary for a first edge of the minimal area rectangle to have a length equal to a predefined length L, and (iii) stretching along the second axis as necessary for a second edge of the minimal area rectangle to have a length equal to the first edge of the minimal area rectangle.

6. The method of claim 5, wherein the points of interest transformed in step (d) have X-Y coordinates in a real number range from 0 to the predefined length L, and wherein the encoding (e) comprises:
(i) converting the X-Y coordinates from the real number range to an integer range;
(ii) storing said converted X-Y coordinates as Gray Code so that similar images have a small Hamming distance and dissimilar images have a large Hamming distance.

7. The method of claim 6, wherein the determining (a) comprises:
(i) segmenting an image to determine image segments; and
(ii) assigning a point of interest to the centroid of each of the image segments.

8. The method of claim 6, wherein the determining (a) comprises using the Harris Interest Point Detector algorithm to define interest points.

9. The method of claim 6, wherein the determining (a) comprises using the Scale Invariant Feature Transform (SIFT) algorithm to define points of interest.

10. The method of claim 6, wherein the determining (a) comprises:
(i) determining affine covariant regions of the image; and
(ii) associating points of interest with said affine covariant regions.

11. The method of claim 10, wherein said determining affine covariant regions comprises using the Maximally Stable Extremal Region (MSER) algorithm to define affine covariant regions.

12. The method of claim 10, wherein said determining affine covariant regions comprises using the Harris-Affine Detector algorithm to define affine covariant regions.

13. The method of claim 10, wherein said determining affine covariant regions comprises using the Hessian-Affine Detector algorithm to define affine covariant regions.

14. The method of claim 10, wherein said determining affine covariant regions comprises using the Edge-Based Region Detector algorithm to define affine covariant regions.

15. The method of claim 10, wherein said determining affine covariant regions comprises using the Intensity Extremal-Based Region Detector algorithm to define affine covariant regions.

16. The method of claim 10, wherein said determining affine covariant regions comprises using the Salient Region Detector algorithm to define affine covariant regions.

17. The method of claim 5, wherein the determining (a) comprises:
(i) segmenting the image into regions; and
(ii) assigning points of interest to places where the regions meet.

18. The method of claim 17, wherein the assigning the points of interest comprises assigning points of interest to places where three or more of the regions meet.

19. A computer based system for generating image fingerprinting comprising:
a memory; and
at least one processor coupled to the memory and configured to:
determine points of interest of an image, each point of interest corresponding to a feature of the image;
determine a bounding area that encompasses said points of interest;
determine a transformation that transforms the bounding area to an oriented bounding area by (i) rotating as necessary to align the edges of the bounding area with predetermined first and second perpendicular axes, (ii) scaling along the first axis as necessary for a first edge of the bounding area to have a length equal to a predefined length L, and (iii) stretching along the second axis as necessary for a second edge of the bounding area to have a length equal to the first edge of the bounding area, wherein the oriented bounding area has a predetermined size, shape, and orientation;
transform the points of interest in accordance with the determined transformation such that the transformed points of interest are encompassed by the oriented bounding area;
encode the transformed points of interest transformed according to the transformation determined by the bounding box generator to create a fingerprint, wherein the fingerprint can be used to identify at least a portion of the image independently of a size, shape, and orientation of the image; and
select the image to be a frame of a video, wherein the fingerprint can be used to identify the frame of the video.

20. The system of claim 19, the at least one processor, when configured to determine a bounding area, further configured to construct a minimal area rectangle and to determine the transformation by:
(i) rotating as necessary to align the edges of the minimal area rectangle with first and second axes,
(ii) scaling along the first axis as necessary for a first edge of the minimal area rectangle to have a length equal to a predefined length L; and
(iii) stretching along the second axis as necessary for a second edge of the minimal area rectangle to have a length equal to the first edge of the minimal area rectangle.

21. The system of claim 20 wherein the transformed points of interest have X-Y coordinates in a real number range from 0 to the predefined length L, and wherein the at least one processor when configured to encode is further configured to:
(i) convert the X-Y coordinates from the real number range to an integer range; and
(ii) store said converted X-Y coordinates as Gray Code so that similar images have a small Hamming distance and dissimilar images have a large Hamming distance.

22. The system of claim 21, the at least one processor, when configured to determine a bounding area, further configured to:
segment the image into regions; and
assign points of interest to places where the regions meet.

23. A method of identifying a video program, comprising:
(a) selecting a sequence of video images from the video program; for each image in the sequence of video images:
(b) defining points of interest of an image, each point of interest corresponding to a feature of the image;
(c) determining a hounding area based on said points of interest;
(d) determining a transformation to transform the hounding area to a predetermined size, shape, and orientation, the determining (d) further comprising:
(i) rotating as necessary to align the edges of the bounding area with predetermined first and second perpendicular axes,
(ii) scaling along the first axis as necessary for a first edge of the bounding area to have a length equal to a predefined length L, and (iii) stretching along the second axis as necessary for a second edge of the bounding area to have a length equal to the first edge of the bounding area;
(e) applying the transformation to the points of interest;
(f) encoding the points of interest transformed in step (e) to create a fingerprint corresponding to the image, wherein the fingerprint can be used to identify the image independently of a size, shape, and orientation of the image;
(g) appending the fingerprint to a sequence of fingerprints for the video program;
(h) for predetermined fingerprint sequences in a database of fingerprint sequences, determining a similarity value corresponding to a degree of similarity between a respective predetermined fingerprint sequence and the sequence of fingerprints for the video program; and
(i) determining whether a predetermined fingerprint sequence matches the sequence of fingerprints for the video program according to the similarity value for the predetermined fingerprint sequence and the sequence of fingerprints for the video program determined in (h).

24. The method of claim 23, further comprising:
(j) determining the video program to be an unauthorized copy when the sequence of fingerprints for the video program matches a predetermined fingerprint sequence in the fingerprint database as determined in step (i).

25. The method of claim 23, wherein said determining a similarity value further comprises ignoring points of interest that appear in less than k of n consecutive frames.

26. The method of claim 23, wherein said determining a similarity value further comprises:
(i) generating a histogram of points of interest appearing in multiple images, over a time interval; and
(ii) considering only the top k interest points by frequency.

\* \* \* \* \*